Feb. 26, 1946.    L. F. MORONEY    2,395,576
AUTOMATIC CLUTCH MECHANISM
Original Filed March 5, 1941

INVENTOR
LAURENCE FRANCIS MORONEY
BY Oberlin, Simbach & Day
ATTORNEYS

Patented Feb. 26, 1946

2,395,576

UNITED STATES PATENT OFFICE 2,395,576

AUTOMATIC CLUTCH MECHANISM

Laurence Francis Moroney, Moonee Ponds, near Melbourne, Victoria, Australia

Original application March 5, 1941, Serial No. 381,865. Divided and this application March 3, 1942, Serial No. 433,171. In Australia May 1, 1940

11 Claims. (Cl. 192—43.1)

This invention relates to improvements in clutch mechanisms and, more particularly, automatic clutch mechanisms for self-starters of automobiles, free-wheeling attachments of bicycles and other power transmission mechanism in which the rotation of a driving shaft by means of an automatic clutch which effects an operative connection between the said driving shaft and a driven member, the clutch being automatically released upon discontinuance of the rotation.

The invention consists of subject-matter divided out from my co-pending application Serial No. 381,865, filed March 5, 1941, and it is directed to an automatic clutch mechanism which comprises a cylindrical casing formed with circumferential teeth on its inner surface and means adapting it for fixture to a driven member coaxially aligned with the driving shaft, a pawl-carrying member (hereinafter termed "rotor") rotatable about the driving shaft within a chamber formed in the casing, a spring-pressed pawl or pawls pivoted on the rotor and adapted to be forced into locking engagement with the casing teeth, and an operating member fixed on the driving shaft. In the form of the invention designed as a bi-directional clutch, two spring-pressed pawls are pivoted on the rotor and the operating member on the driving shaft is so constructed that upon rotation of said shaft in either direction the said operating member actuates both pawls simultaneously and causes them to lock the rotor relatively to the casing, whereby the driving shaft, the rotor, the casing, and the driven member are rotated unisonally. The said driven member may be secured to the casing, or it may be formed integrally therewith. Upon discontinuance of the rotative force applied to the driving shaft, the pawls are immediately withdrawn from their locking engagement with the casing teeth by the force of the springs acting upon them.

Reference is now made to the accompanying explanatory drawing, wherein.

Figure 1:
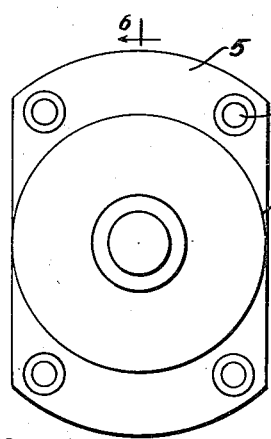
Figure 1 is a view in front elevation of the clutch mechanism assembled for affixture to the driven member of a mechanism.
Figure 3:
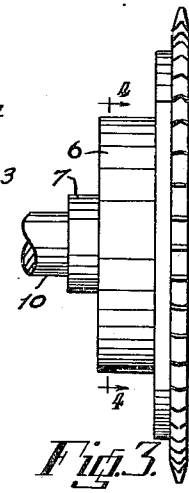
Figure 3 is a side elevation illustrating the clutch mechanism secured to the driven member which consists of a sprocket wheel.
Figure 2:
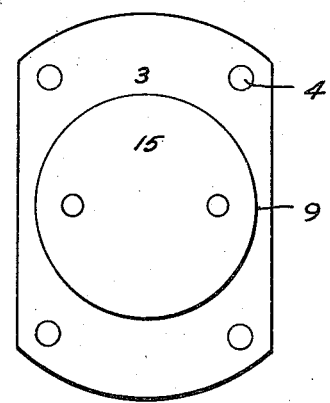
Figure 2 is a view in rear elevation of the same.
Figure 4:
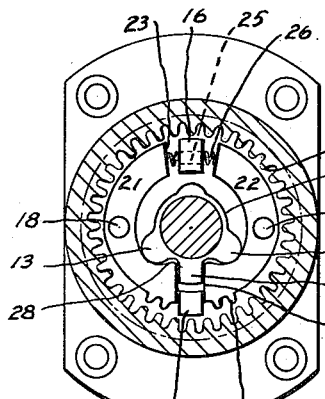
Figure 4 is a sectional view on the line 4—4 of Figure 3, showing the integers of the clutch mechanism disengaged.
Figure 6:
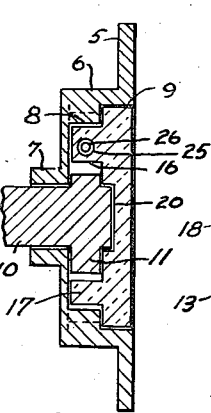
Figure 6 is a sectional view of the clutch mechanism taken on the line 6—6 of Figure 1.
Figure 5:
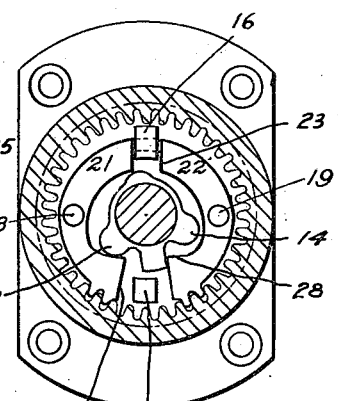
Figure 5 is a sectional view similar to Figure 4, but illustrates the pawls forced outwardly by the operating member on the driving shaft whereby their teeth are in engagement with the casing teeth.
Figure 7:
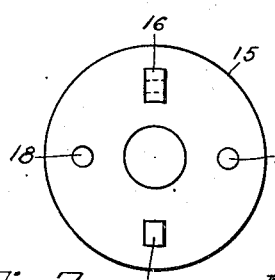
Figure 7 is a front elevation of the rotor.

Reference is made initially to Figures 1 to 7 wherein 2 is a sprocket wheel, indicative generally of a driven element which is to be rotated by operation of the clutch mechanism. A casing 3 is secured to the sprocket wheel by bolts passed through holes 4 formed in an attachment flange 5 with which the casing is provided. The casing comprises a cylindrical member 6 having at one end a central tubular boss 7. The casing is formed interiorly with equidistant circumferential teeth 8 and having a cylindrical chamber 9 having a smooth internal surface and of larger diameter than the pitch circle of said teeth.

10 indicates a driving shaft passed through the tubular boss 7 and having one end projecting outwardly beyond said boss whereby it is adapted to be engaged or rotated by a driving mechanism which may be of any suitable type. The inner end of the driving shaft is provided with an operating member 11 which may be formed integrally with said shaft or fixedly secured thereto. This operating member consists of a short lever arm 12 having on opposite sides thereof cam members 13 and 14 which are for the purposes to be hereinafter explained.

Fitting within the chamber 9 of the casing 3 is a rotor 15 which is formed with diametrically opposite stop members 16 and 17 and opposed studs 18 and 19. The rotor is dimensioned to fit freely between the internal teeth 8 of the casing 3 with the stops 16 and 17 and the studs 18 and 19 on said rotor projecting within the chamber 9. A shallow recess 20 is formed centrally on the inner surface of the rotor and serves as a support and bearing for the inner end of the shaft 10. The stops 16 and 17 are designed to clear the teeth 8 during rotation of the rotor 15 relative to the casing 3, and the studs 18 and 19 are set inwardly a short distance from the perimeter of the rotor so that pawls 21 and 22 which are pivotally mounted on said studs will clear the teeth 8 by a short distance.

The pawls 21 and 22 are of curved configuration and formed with flat radial surfaces 23 and 24 at their opposite ends, and they are apertured at approximately mid-position to pivotally fit on the studs 18 and 19. Thus pivotal movements imparted to the pawls are restricted by the stops 16 and 17, the flat surface 23 bearing evenly upon one side of the stop 16 at one limit of a movement and the surface 24 bearing similarly upon a side of the opposite stop 17 at the other limit of the movement.

Fitted within a hole 25 in the stop 16 is a short helical compression spring 26 having its opposite ends projecting beyond the sides of the stop. The ends of the spring press upon the flat surfaces 23 of the pawls 21 and 22 forcing the same apart to the limit of permissible movement determined by the opposed flat surfaces 24 abutting against the sides of the stop 17. Each of said pawls has one or more teeth 27 formed on its outer curved surface near the flat radial surface 24, and its inner surface is shaped to the configuration of a cam 28. The profiles of the pawls preferably are identical in order that an interchange of the pawls may be effected without affecting the operation of the mechanism.

The operating member 11 fixed on the inner end of the driving shaft 10 fits between the pawls 21—22 with its lever arm 12 disposed between the flat surfaces 24 of said pawls and its cam members 13 and 14 in contact with the cam surfaces 28 provided on the inner sides of said pawls. The spring 26 is of such strength that it will absorb slight uncontrolled forces exerted by the operating member 11 so as to thereby prevent the pivoted pawls being actuated by slight vibratory movements of the driving shaft 10.

When the shaft 10 is driven in either direction by the mechanism connected to its outer end, initial rotation of the operating member causes the spring 26 to yield before the closely fitted rotor 15 can overcome its frictional drag to start to rotate, and thus the member 11 causes the pawls 21 and 22 to turn on their pivot studs 18 and 19, respectively, against the pressure exerted by the spring 26 so that the pawl teeth 27 are forced outwardly into engagement with the internal circumferential teeth 8 of the casing 3. The pawls are locked in engagement with the casing teeth as long as the rotational force exerted by the driving shaft 10 continues. Consequently the rotor 15 carrying the pawls is locked relatively to the casing 3 and an operative connection between the driving shaft and said casing is effected and further rotatable movement of the driving shaft will cause said casing with the driven member fastened thereto to be rotated.

Upon release of the driving force applied by the shaft 10 the compressed spring 26 will impart pivotal movement to the pawls 21 and 22 whereby their teeth 27 will be withdrawn from engagement with the teeth 8 of the casing 3 whereupon said casing with the driven member 2 that is secured thereto may continue to rotate freely or it may cease to rotate, depending upon the nature of the said member 2.

The pawl operating member 11 is symmetrical in configuration and the pawls 21 and 22 are identical in their shape and pivotal mounting. Hence, rotation of the driving shaft 10 in clockwise or anti-clockwise direction will effect a locking engagement of the pawl teeth 27 with the casing teeth 8. Consequently, the mechanism hereinbefore described and illustrated by Figures 1 to 7 constitutes a bi-directional, positive automatic clutch.

Figure 8:
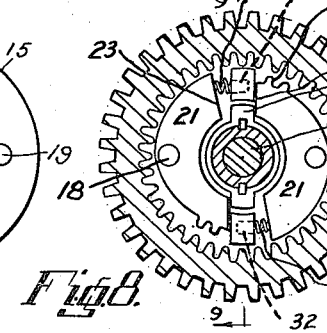
Figure 8 is a sectional elevation illustrating a modified construction of the mechanism according to which the driven member is formed integrally with the casing of the clutch and wherein the arrangement of the pawls is such as to provide a uni-directional clutch in lieu of the bi-directional clutch illustrated in Figures 1 to 7.
Figure 9:
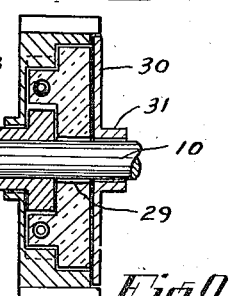
Figure 9 is a sectional view taken of the line 9—9 of Figure 8.
Figure 10:
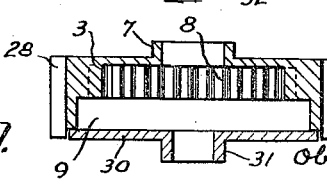
Figure 10 is a transverse section of the combined clutch casing and driven member shown in Figures 8 to 9.

In Figures 8 to 10 I have illustrated a modification of the improved clutch mechanism according to which the casing 3 and the driven member 2, instead of being formed separately and then secured together as hereinbefore described, are formed integrally. As an example of this unitary construction, the casing 3 is illustrated as one formed with external circumferential teeth 28' and having internal circumferential teeth 8 and a chamber 9 having a smooth internal surface as previously described. The rotor 15 is freely rotatable within the chamber 9. The driving shaft 10 is passed through a hole 29 formed axially in said rotor and it extends through the casing 3. The operating member 11 fixed on the shaft 10 fits between the pivoted pawls 21. A cover plate 30 formed with a boss 31 to thus provide a bearing for said shaft is bolted to the casing 3 whereby the integers of the mechanism are maintained in correct operative relationship.

The bi-directional clutch mechanism hereinbefore described may be modified to provide a uni-directional clutch. This is accomplished by omitting one of the pivoted pawls 21 and substituting for the pawl-operating member 11 a simple lever arm fixed on the driving shaft 10 to operate similarly to the lever arm 12 of said member 11. Alternatively, there may be formed on the face of the rotor 15 two opposed stops 16 each having a socket 32 accommodating a helical compression spring 26'. These springs act upon the flat surfaces 23 of two pawls 21 pivoted on studs 18 integral with the rotor 15. A double-acting lever 33, which is non-turnably fixed on the driving shaft 10, acts upon the ends of the pawls 21 so that rotation of the driving shaft in clockwise direction causes the pawl teeth 27 to engage the teeth 8 of the casing 3 and be maintained in mesh until discontinuance of the driving force exerted on the shaft, whereupon the springs 26' acting upon the opposite end portions 23 of the pivoted pawls causes their teeth 27 to be withdrawn from locking engagement with the casing teeth.

What I do claim is:

1. Clutch mechanism comprising a cylindrical casing formed with teeth arranged circumferentially around its inner surface and adapted for fixture to a driven member co-axially aligned with a driving shaft, a circular chamber formed in said casing, a rotor within said chamber rotatable about the driving shaft, a pivoted pawl on said rotor having one end adapted for engagement with said casing teeth, said pawl having an arcuate shape and being pivoted medianly, and the other end being non-engageable, a spring acting on one end of said pawl tending to keep the other end free from said casing teeth, and operating means on the driving shaft arranged upon rotation of said shaft to engage said other end of said pawl and to pivotally actuate said pawl against the pressure of said spring and force it into locking engagement with the casing teeth.

2. Clutch mechanism, according to claim 1, and wherein the casing is formed integrally with the driven member.

3. Clutch mechanism according to claim 1, and wherein the casing is formed circumferentially with external teeth for the purposes described.

4. Clutch mechanism according to claim 1, and wherein the chamber for the rotor is formed peripherally on the casing and is of larger diameter than the pitch circle of the teeth formed on the inner surface of said casing and a recess is formed centrally in the rotor to support the inner end of the driving shaft.

5. Clutch mechanism according to claim 1, and wherein the pivoted pawl is formed having at one end a flat radial surface upon which the spring presses and teeth at its opposite end adapted for locking engagement with the casing teeth.

6. Clutch mechanism according to claim 1, and wherein the pivoted pawl has flat radial surfaces at its opposite ends, a stop limiting the pivotal movement of said pawl is formed on the rotor, a compression spring is fitted in a hole in said stop and presses upon one of the flat surfaces of the pawl, and teeth are formed at the opposite end portion of the pawl adapted for engagement with the casing teeth.

7. Clutch mechanism according to claim 1, and wherein the pivoted pawl has flat radial surfaces at its opposite ends, a stop limiting the pivotal movement of said pawl is formed on the rotor, a compressing spring is fitted in a hole in said stop and presses upon one of the flat surfaces of the pawl, teeth are formed at the opposite end portion of the pawl, and a lever is fixed on the driving shaft and is adapted upon rotation of said driving shaft in clockwise direction to impinge against a flat surface of the pawl and impart pivotal movement thereto whereby its teeth are forced against the pressure of the spring into locking engagement with the casing teeth.

8. Clutch mechanism comprising a cylindrical casing formed with teeth arranged circumferentially around its inner surface and adapted for fixture to a driven member co-axially aligned with a driving shaft, a circular chamber formed in said casing, a rotor within said chamber rotatable about the driving shaft, studs on said rotor, a pair of spring-pressed pawls of arcuate shape pivoted medianly on said studs and having teeth on diametrically opposite ends designed for locking engagement with the casing teeth and the other ends being non-engageable, and a double-acting lever fixed on the driving shaft adapted to simultaneously actuate said pivoted pawls upon the rotation of the driving shaft in one direction and thereby lock said rotor relatively to said casing, whereby said driving shaft, rotor, casing and driven member are rotated unisonally in one direction and upon rotation of the driving shaft in the opposite direction said pawls are inoperative.

9. Clutch mechanism comprising a cylindrical casing formed with teeth arranged circumferentially around its inner surface and adapted for fixture to a driven member co-axially aligned with a driving shaft, a circular chamber formed on said casing, a rotor disposed within said chamber rotatable about the driving shaft, a pair of oppositely arranged spring-pressed pawls pivoted on said rotor and having teeth designed for engagement with the casing teeth, said pawls being arcuate shaped and pivoted medianly, and an operating member fixed on the driving shaft and operative to engage adjacent ends of the pivoted pawls, said operating member being adapted to simultaneously actuate the pawls upon rotation of the driving shaft in either direction so that the pawl teeth are forced into engagement with the casing teeth to lock the rotor to the casing whereby the driving shaft, rotor, casing and driven members are rotated unisonally.

10. Clutch mechanism according to claim 9, and wherein the rotor has diametrically opposite stop members and the pawls pivoted on said rotor have inner surfaces of cam shape with flat radial surfaces at their opposite ends, and wherein the operating member fixed on the driving shaft consists of a lever arm positioned between opposed flat surfaces of said pawls and cam members to co-act with the cam-shaped surfaces of said pawls.

11. Clutch mechanism according to claim 9, and wherein the rotor has diametrically opposite stop members and the pawls are pivoted at approximately their mid positions on studs carried by the rotor, said pawls having inner surfaces of cam shape with flat radial portions at their opposite ends, a compression spring fitted in a hole formed in one of said stop members presses upon opposed flat portions of said pawls, and wherein the operating member fixed on the driving shaft consists of a lever arm arranged between opposed flat portions of said pawls at the ends thereof opposite to those whereon said spring presses and cam members adapted to co-act with the cam-shaped surfaces of said pawls, the said lever arm and cam members being of integral construction.

LAURENCE FRANCIS MORONEY.